UNITED STATES PATENT OFFICE.

JOHN FREDRICK WYHER, OF PITTSBURG, PENNSYLVANIA.

COMPOSITION FOR ARTIFICIAL STONE.

No. 802,900. Specification of Letters Patent. Patented Oct. 24, 1905.

Application filed June 23, 1905. Serial No. 266,671.

*To all whom it may concern:*

Be it known that I, JOHN FREDRICK WYHER, a citizen of the United States of America, residing at Pittsburg, in the county of Allegheny and State of Pennsylvania, have invented new and useful Improvements in Compositions, of which the following is a specification.

This invention relates to compositions having in view the production of an inexpensive material adapted for use as an artificial stone in building construction and the provision of a material of this class which will be strong and durable and may be readily molded into shape for use.

In the production of the improved composition I employ slag, cinder, scales from iron, and refuse or scrap tin. These materials mixed in suitable proportions are melted in a furnace or in other suitable manner and run into molds for casting in the form of bricks or blocks, the iron and tin serving to bind the slag and cinder in the resultant mass, thus producing a strong, durable, and compact material which will form an excellent substitute for brick or stone in the construction of buildings or the like.

It is to be noted that the materials employed in the production of the composition are all in the nature of waste or refuse naturally resulting in a steel plant, and that consequently by utilizing this waste material the usual loss resulting therefrom is obviated and the building material is inexpensively produced.

From the foregoing it is apparent that I produce an inexpensive material which will serve as an excellent substitute for brick or stone and one which will be strong and durable and at the same time sufficiently light to be readily handled, it being understood in attaining these ends minor changes in the proportions of the materials employed and in the manner of treating them to obtain the resultant product may be resorted to without departing from the spirit of the invention.

Having thus described the invention, what is claimed as new is—

The herein-described composition consisting of slag, cinder, iron scales and tin mixed in suitable proportions and melted to form an integral mass.

In testimony whereof I affix my signature in presence of two witnesses.

JOHN FREDRICK WYHER.

Witnesses:
JOHN J. MINK,
CHAS. F. ENGEL.